US005491933A

United States Patent [19]
Miller et al.

[11] Patent Number: 5,491,933
[45] Date of Patent: Feb. 20, 1996

[54] FLAT FLOOR SLIDE OUT APPARATUS FOR EXPANDABLE ROOMS

[75] Inventors: Mahlon A. Miller, 8443W 1100N, Nappanee, Ind. 46550; David A. Blosser, Middlebury, Ind.

[73] Assignee: Mahlon A. Miller, Nappanee, Ind.

[21] Appl. No.: 308,971

[22] Filed: Sep. 20, 1994

[51] Int. Cl.$^6$ ..................................... B60P 3/34
[52] U.S. Cl. .................. 52/67; 296/26; 296/165; 296/171; 296/175; D12/104
[58] Field of Search .................. 52/67; 296/171, 296/172, 173, 175, 176, 165, 26; D12/104

[56] References Cited

U.S. PATENT DOCUMENTS

| | | | |
|---|---|---|---|
| Re. 32,262 | 10/1986 | Stewart | 52/67 X |
| 1,279,819 | 9/1918 | Zingsheim et al. | 52/67 |
| 1,521,635 | 1/1925 | Lewis | 52/67 |
| 2,136,130 | 11/1938 | Gorlenko | 52/67 X |
| 2,704,223 | 3/1955 | Houdart | 52/67 X |
| 2,813,747 | 11/1957 | Rice, Jr. | 296/171 |
| 4,900,217 | 2/1990 | Nelson | 296/26 X |
| 4,930,837 | 6/1990 | Marsh et al. | 296/175 X |
| 5,237,782 | 8/1993 | Cooper | 52/67 |
| 5,332,276 | 7/1994 | Blodgett, Jr. | 296/171 X |
| 5,333,420 | 8/1994 | Eden | 52/67 |

FOREIGN PATENT DOCUMENTS 1570553  6/1969  France ................... 296/26

OTHER PUBLICATIONS

Barker Manufacturing Co., of Battle Creek, MI; Rollout Rack Drive Assembly Print; Jan. 6, 1994.

*Primary Examiner*—Carl D. Friedman
*Assistant Examiner*—Laura A. Saladino
*Attorney, Agent, or Firm*—Ryan M. Fountain

[57] ABSTRACT

An expandable room structure is provided having relatively movable room portions supported by telescopically sliding tubes, at least one of those tubes being movable also laterally to pivot as the room portion floors slide into the same horizontal plane when the room structure is moving into expanded positions. In retracted positions the room portion floors are vertically spaced to permit one room portion to nest within the other. A rack and pinion drive arrangement is provided to cause relative movement between the tubes. Lateral movement of one of the tubes is permitted by engagement with an inclined surface extending out of the other tube such that the laterally moving tube pivots about the pinion. A ramp surface is formed on the abutting edge of the floor of one room portion, and the abutting edge of the floor of the other room portion moves up and down that ramp portion when transitioning between expanded and retracted positions. When moving to expanded positions, such movement down the ramp occurs prior to pivoting of the sliding tube(s), such that end wall weather sealing is pivotably clamped without vertical sliding.

14 Claims, 6 Drawing Sheets

5,491,933

FLAT FLOOR SLIDE OUT APPARATUS FOR EXPANDABLE ROOMS

BACKGROUND AND SUMMARY OF THE INVENTION

The present invention relates generally to expandable rooms for habitable accommodations in static structures and vehicles. More particularly, this invention relates to room structures that are telescopically slidable between retracted and expanded positions.

Various motorized and towable vehicles are known which have rooms or portions thereof that can be adjusted between expanded and retracted positions in order to provide more or less internal accommodation, respectively, as desired by the user. In a typical structure, one portion of room is movable and telescopically received or nested within a portion of the room that remains fixed. Similar structures can be used effectively in buildings, although for convenience the discussion below focusses primarily on the vehicular examples.

When the vehicle, a Class A motor home, for example, is in motion the room remains in a retracted position. As such, there is typically adequate space within the room to accommodate users in transit and remain within the standard width limitations imposed upon motor vehicles. When the motor home is stopped for a length of time, however, it is often desirable to increase the size of internal accommodations. At that point users can slide the nested room portion out to its fully expanded position.

These movable room portions usually include a floor, a roof, a side wall and one or more end walls. In the retracted positions, the roof and end walls are typically concealed from exterior view and the room side wall forms a portion of the vehicle side wall. At the same time, the floor of the movable portion of the room typically rests above the floor of that portion of the room which remains fixed, and may form a portion of the usable interior floor during vehicle transit. Similarly, the ceiling of the movable roof portion may define the interior ceiling of that part of the vehicle during transit.

However, since the movable portion of the room is nested within the fixed portion of the room, the movable portion usually has at least some smaller dimensions than the fixed portion. Thus, when the movable portion is in expanded positions it is not uncommon for the floor of the movable portion to be higher than the floor of the fixed portion and for the ceiling of the movable portion to be lower than the ceiling of the fixed portion. Unfortunately, such stepped flooring has frequently been found to be undesirable, inconvenient and somewhat hazardous.

For example, due to the slight height difference of the step between floor portions, it can be overlooked by users an cause tripping or stumbling if care is not taken. Further, that step limits the freedom of movement of furniture within the room. Also, the step makes it more difficult to create an aesthetically pleasing floor appearance.

In response, certain slide out room structures have been suggested which permit the floor sections to have a flush upper surface in at least some expanded positions. Unfortunately, such structures can be overly complicated, expensive and relatively heavy. These can be serious drawbacks. In the vehicular environment, unnecessary slide mechanism weight cuts down on fuel economy when the vehicle is in transit. Also, vehicular structures often need to have greater insensitivity to vibration. Further, expandable or slide out rooms are commonly employed in recreational vehicles. As such, reliability, of operation and minimal cost are important factors in marketing of the vehicle.

Also, some of these prior room structures have been found to have deficiencies in the weather sealing between the room portions. Since recreational vehicles are often used during inclement weather, defective weather sealing is a significant matter. It is believed that the weather sealing problems of certain prior movable room structures arise because the method of room movement involves first fully extending the movable room portion and then lowering the movable floor portion into alignment with the fixed floor portion. In doing so, the weather sealing strips often placed on the movable end walls first fully engage the receiving end walls of the fixed portion of the room and are then slid downwardly as the floors arc nude flush. Unfortunately, this downward sliding can damage the weather sealing strips and/or cause the sealing integrity to be reduced.

In designing an improved slide out mechanism for movable rooms, several other factors should be considered as well. For example, as the room expands, misalignment of the movable room portion can cause the end walls to bind together. This misalignment concern increases as the length of the movable room increases and as multiple slide support structures are employed to move the room portion. Further, as the width of the room and/or the extension distance out from the vehicle increases, the cantilevering forces exerted on the slide mechanism tend to cause sagging of the movable side wall. As a result, there is a tendency for the floor portions to separate at their abutting edges. Also, since for safety reasons and convenience the room portions typically need to be locked in place once in the expanded and retracted positions, the slide out mechanism should not interfere with or preclude ease of using the locking mechanism. In addition, since primary drive devices for the slide out mechanism, such as electric motors, will after time wear out, an easily available back up or emergency drive device should be included.

Accordingly, it is an object of this invention to provide an improved expandable room structure. Further objects include the provision of an expandable room structure that:

A. is relatively inexpensive to manufacture and reliable in use,

B. is of minimal weight and maintains sliding alignment against end wall binding, C. creates a flush overall floor in expanded positions, D. includes an easily accessible back up drive arrangement, E. is durable and convenient to use in vehicles, and F. maintains effective weather sealing.

These and other objects of the present invention are obtained by the provision of an expandable room structure having relatively movable room portions supported by telescopically sliding tubes, at least one of those tubes being movable also laterally to pivot as the room portion floors slide into the same horizontal plane when the room structure is moving into expanded positions. In retracted positions the room portion floors are vertically spaced to permit one room portion to nest within the other. A rack and pinion drive an-arrangement is provided to cause relative movement between the tubes. Lateral movement of one of the tubes is permitted by engagement with an inclined surface extending out of the other tube such that the laterally moving tube pivots about the pinion. A ramp surface is formed along the abutting edge of the floor of one room portion, and the abutting edge of the floor of the other room portion moves up and down that ramp surface when transitioning between expanded and retracted positions. When moving to expanded positions, such movement down the ramp surface occurs prior to pivoting of the sliding tube(s), such that end wall weather sealing is pivotably clamped substantially without vertical sliding.

Especially for longer room structures, a plurality of such sets of telescopically sliding tubes can be used in cooperation to avoid end wall binding. A common cross shaft is joined to the pinions of the drive arrangements of each set, and a drive motor is connected to that cross shaft. Also, a keyed surface can be formed on the cross shaft to permit manual driving force to be applied.

Other objects, advantages and novel features of the present invention will now be readily apparent to those of skill in the pertinent art from the following drawings and detailed description.

DESCRIPTION OF PREFERRED EMBODIMENTS

Figure 1:
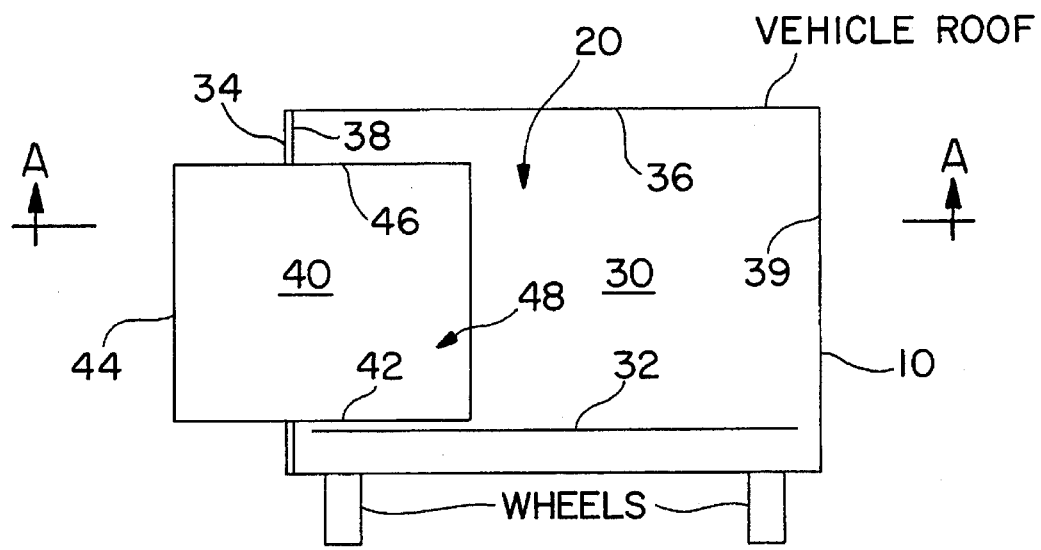
FIG. 1 shows schematically a cross sectional front end view of a vehicle having an expandable room according to the teachings of the present invention when the room is in a partially retracted position.

FIG. 1 through 6 and 1A show a preferred embodiment of the present invention as mounted in a vehicle, such as a Class A motor home or like motorized or towable recreational vehicle. The view of FIG. 1 is from the front of the vehicle looking to the rear, with the slide out room mounted for expansion on the left side of the vehicle. The present invention is not, however, limited to such arrangements, and has applicability, for example, to slide out rooms mounted for expansion on the right side or rear of the vehicle. Similarly, this invention is suitable as well for use in static structures, such as buildings, even though the preferred embodiments described herein are explicitly for vehicular applications.

Vehicle 10 includes slide out or expandable room structure 20 having first room portion 30 and second room portion 40. Room structure 20 is typically placed in a middle region along the length of the vehicle and forms a living and/or dining room area. Room portion 30 is, for example, fixed or stationary relative to vehicle 10, and room portion 40 is movable relative to vehicle 10 and room portion 30. In retracted positions, room portion 40 is telescopically received or nested within room portion 30. In expanded positions, room portion 40 extends outwardly from room portion 30 in a cantilevered manner. The present invention provides a means for obtaining a flush floor within room structure 20 when room portion 40 is in expanded positions.

Room structure 30 includes first floor section 32, side wall sections 34, roof section 36 and end wall sections 38. In FIG. 1–6, only a single side wall and end wall section are shown. It will be understood from FIG. 1A, however, that another set of such walls is formed on the opposite side of the opening made in vehicle 10 to receive room portion 40. Side wall sections 34 preferably form part of the exterior sides of the vehicle. End wall sections 38 extend inwardly from side wall sections 34 and define a stop to the expansion movement of room portion 40. To achieve the maximum width of room structure 20 in expanded positions, the inward length of end wall sections 38 can be minimal. In especially preferred embodiments that length is nominal, and end wall sections 38 serve only to define the portion adjacent to or integral with side wall 34 upon which the weather sealing strips are mounted and/or in abutment Room portion 40 includes second floor section 42, side wall section 44, roof section 46 and end wall sections 48. Again, in FIGS. 1–6 only a single end wall section 48 is shown, but it will be understood from FIG. 1A that such an end wall section is formed on each end of side wall section 44. These end wall sections extend inwardly to close side wall section 44 with side wall sections 34 when room portion 40 is in expanded positions. Thus, the inward length of end wall sections 48 define the limit of expansion of room portion 40. To achieve the maximum width of room structure 20, the inward length of end wall sections 48 can be maximized up to the point where those walls interfere with structure on the inside of vehicle 10 opposite side wall section 44 (such as cabinets, sinks, wall 39 or the like). However, in especially preferred embodiments where the vehicle is to be occupied when room portion 40 is in retracted positions, the inward length of end wall sections 48 is not maximized. Instead, a balance is achieved by making the inward length as large as it can be without unduly interfering with use of the vehicle interior during transit.

Figure 2:
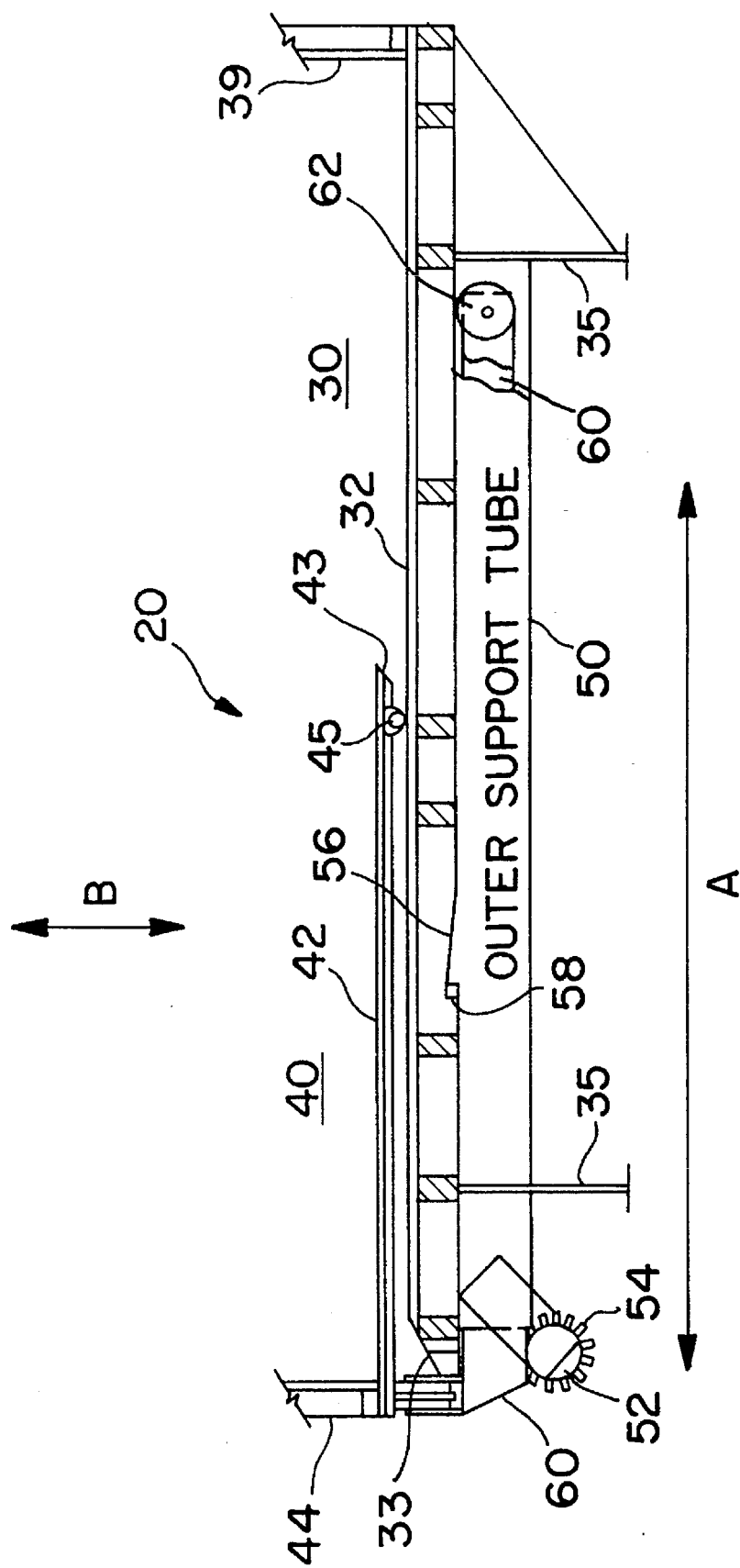
FIG 2 shows an enlarged cross sectional front view of a the lower portion of the expandable room of the vehicle of FIG. 1 when that room is in a retracted position.
Figure 3:
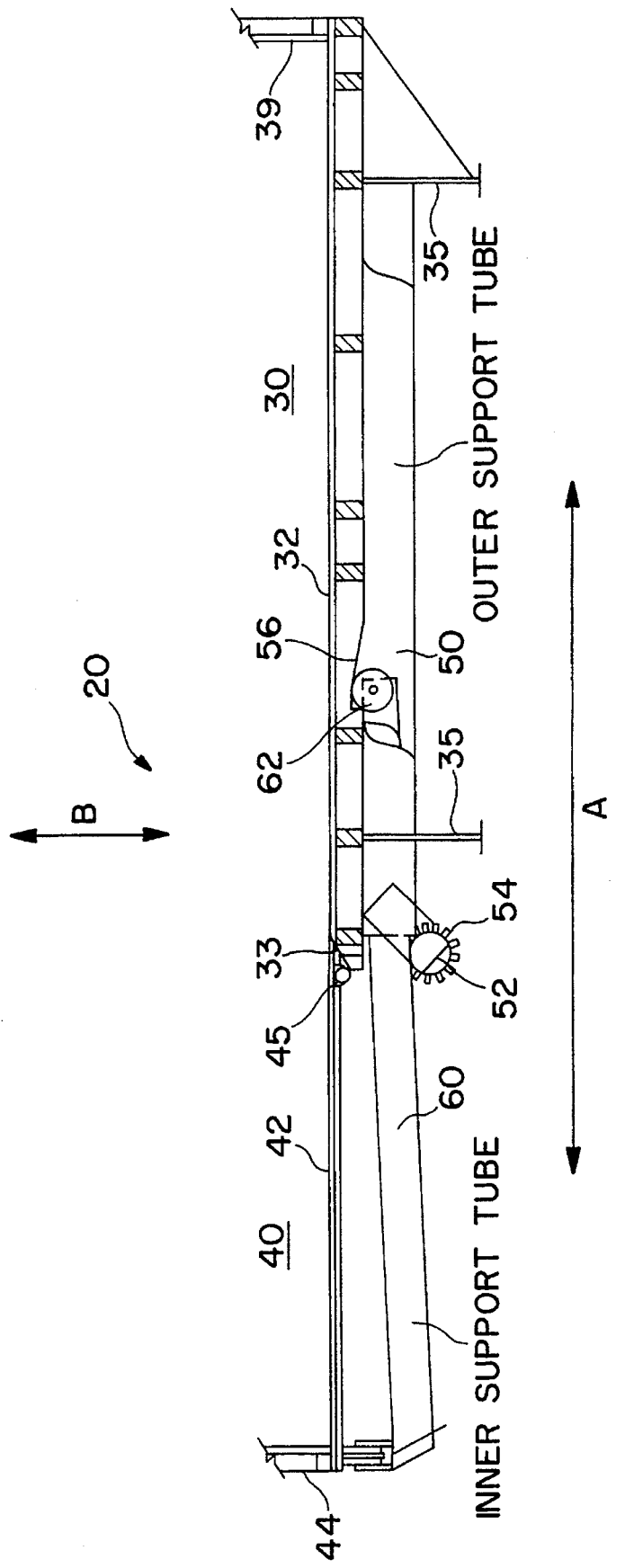
FIG. 3 shows a cross sectional front view, corresponding to that of FIG. 2, when the room is in an expanded position.

As shown especially in FIGS. 2 and 3, telescopically sliding tubes or rails are mounted under room structure 20 to provide support and control during expansion and retraction. In the embodiments shown, these tubes provide both support for room portion 40 and the actuation means for positioning that room portion. However, the present invention contemplates that in certain embodiments those functions can be achieved by separate elements.

Preferably, at least two of such tubes are mounted at positions spaced apart along the length of room structure 20, that length forming a portion of the length of vehicle 10. In especially preferred embodiments, these sets of tubes are aligned such that their length in longitudinal direction A is along the line of expansion and retraction of room portion 40, across the width of the vehicle. Each set of these tubes includes at least two tube elements.

A first, outer support tube 50 is, for example, fixedly mounted to the main frame or flooring beam structure 35 beneath room portion 30. A second, inner support tube 60 is slidably mounted within tube 50 and fixed at one end to room portion 40 adjacent the lower portion of side wall section 44. In this way, room portion 40 has a slidable, cantilever mounting to room portion 30.

A free rolling wheel 62 or similar device is attached to the opposite end of tube 60 and inserted within tube 50 to serve as a support roller and assist in the longitudinal sliding of tube 60 into and out of tube 50. Tube 60 is formed, for example, as a rectangular conduit and also includes a series of spaced apart openings or slots 64, preferably along its lower surface or side. In the example shown, tube 60 is dimensioned to have clearance for sliding within tube 50 and for lateral upward movement as will be described further below. However, it will be understood that other embodiments can reverse the orientation of tubes, such that tube 50 is within tube 60, especially if an open rail structure is employed.

Preferably, a rack and pinion-type drive mechanism is employed for causing relative movement between tubes 50 and 60. For example, a drive and support wheel 52 is mounted adjacent the open end of tube 50 through which tube 60 moves. This wheel has a plurality of projections or prong teeth 54 about its circumference which are dimensioned so as to be freely engagable within slots 64. Wheel 52 is positioned on tube 50 and relative to tube 60 such that teeth 54 are aligned with and inserted into slots 64. In this way, rotation of wheel 52 supports tube 60, drives the sliding movement of tube 60 and positively locates that tube within tube 50. Thus, wheel 52 also precisely locates room portion 40 with respect to room portion 30.

Tube 50 further includes an inclined ramp or surface 56 extending upwardly which functions as an outward notch in lateral direction B toward room portion 30. In especially preferred embodiments where tube 50 has a rectangular cross section, ramp 56 is formed on the upper interior surface of the tube, facing tube 60, by separating a portion of that surface from the rest of the tube. For example, tube 50 can be cut at the intersection of the side walls and top wall of the tube and then sliced across the top wall at one end of that cut (preferably that end closest to drive wheel 52) in order to permit the flap formed thereby in the top wall to be lifted upward and outward. To maintain the desired slope and upward location of the flap, a strap element 58 is welded or otherwise secured in place between the free end of the flap and the portion of tube 50 below that free end. The interior dimensions of ramp 56 are established to permit wheel 62 to roll or slide upward to strap clement 58. Preferably, the lateral elevation of ramp 56 at its upper end is sufficient that strap clement 58 defines the limit of travel of wheel 62 towards drive wheel 52 and the open end of tube 50.

Floor section 32 includes an inclined or sloped end region or surface 33 at the edge which abuts floor section 42 when room structure 20 is in expanded positions. This inclined surface 33 serves as a ramp to permit room portion 40 to move laterally, as it moves longitudinally, between positions where floor section 42 is above floor section 32 and positions where floor section 42 is flush with floor section 32. As used herein, when these floor sections are "flush" their top surfaces are in substantially the same plane, preferably a horizontal plane, without a noticeable elevation between them.

Floor section 42 includes, for example, mating inclined surface 43 so as to facilitate a smooth and flush abutment between the floor sections. Floor section 42 also includes at least one roller or carrier 45 mounted to the underside of that floor section to movably support room portion 40 on room portion 30 in retracted positions. Roller 45 also facilitates telescopic sliding of the room portions between expanded and retracted positions, and especially up and down inclined surface 33.

Figure 4:
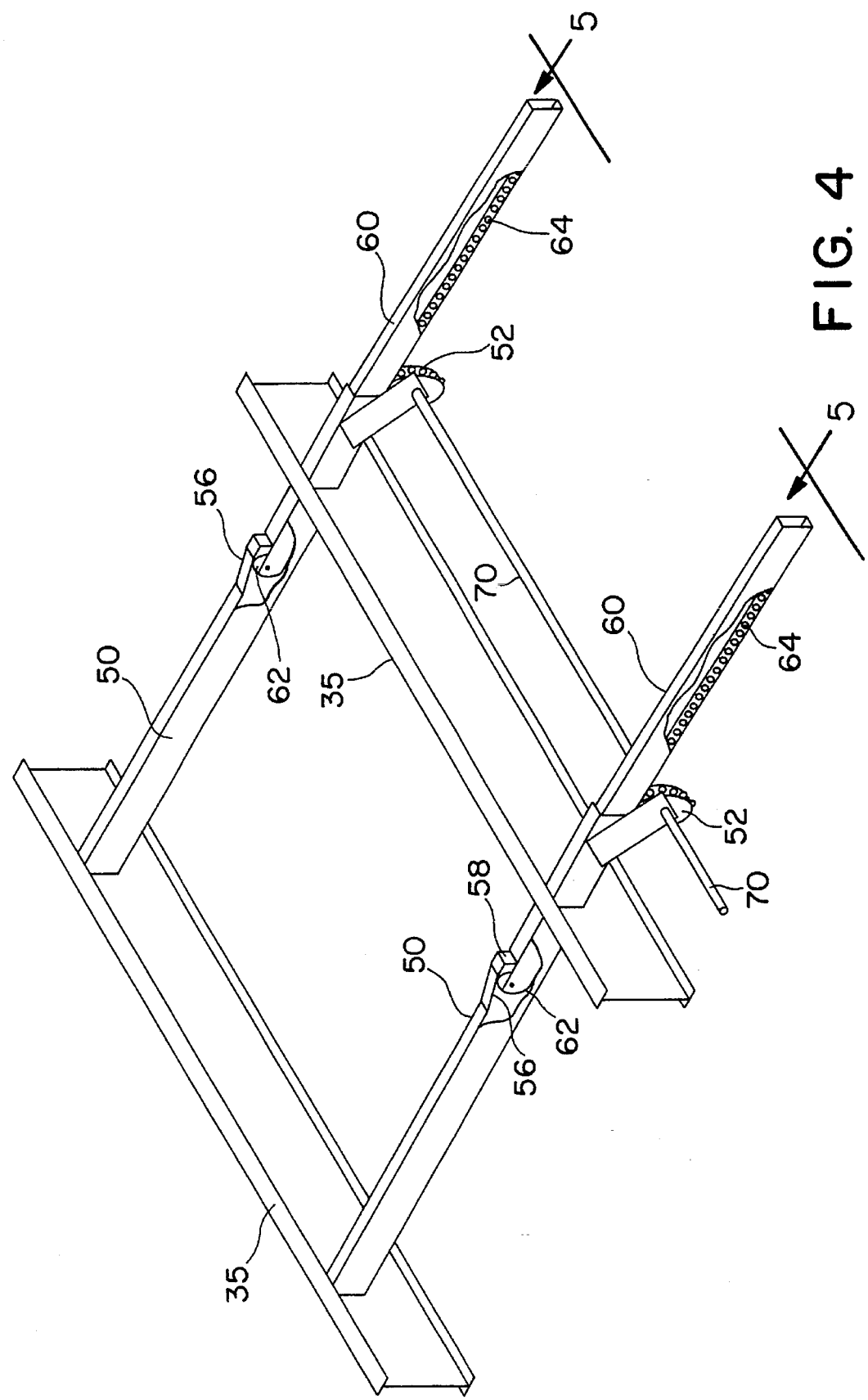
FIG. 4 shows a top, back perspective view of the room support structure of the embodiment of FIG. 2 when in an expanded position, with portions thereof broken away.

As shown especially in FIG. 4, each set of tubes 50 and 60 are connected by a cross shaft 70 joining drive wheels 52, preferably through the axis (or axes) of rotation of those drive wheels. Thus, cross shaft 70 can serve as a direct drive shaft to transmit rotational force to drive wheels 52 In this way, both sets of tubes (and, thereby, both ends of room portion 40) can be driven at the same speed.

Figure 5:
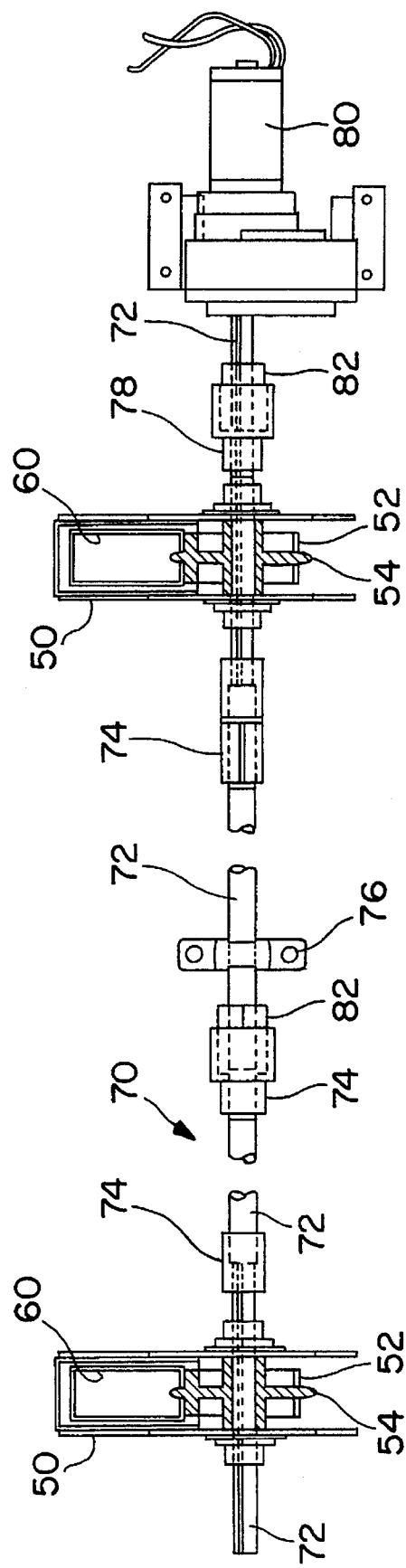
FIG. 5 a cross sectional side view of a specific embodiment of the support structure system of the embodiment of FIG. 2, as taken along line 5—5 of FIG. 4.

FIG. 5 shows a specific embodiment of a preferred drive shaft arrangement for that purpose. It is not, for example, necessary to employ a single rod for cross shaft 70: multiple shaft segments or rods 72 (separately or combined into drive wheels 52) can be rigidly joined by various conventional adapters or couplings 74. If it becomes important to avoid radial bending of the cross shaft in a particularly long expandable room, one or more bearings 76 can be disposed intermediate drive wheels 52 and secured to any convenient support surface. At least one motor 80 is connected through coupling 78 to cross shaft 70 as the primary drive device to provide rotational force thereto. Preferably one synchronized electric gear motor 80 is disposed on each of the two ends of the cross shaft for this purpose.

In addition, a keyed or flattened surface or adjacent bushing 82 is provided with at least one of the adapters or couplings 74 attached to cross shaft 70, preferably intermediate drive wheels 52. Keyed surface 82 is configured to mate with a common hand tool, such as a wrench, or a specially formed tool to permit the application of rotational force to the cross shaft manually, as in the case of an emergency or break down of the primary drive device. Conventional electric control circuits are, for example, connected to electric motors 80 to permit operation from inside the vehicle. Preferably, however, Keyed surface 82 is located in an easily accessible region of the vehicle exterior.

In operation, after stopping the vehicle the user or operator will typically first unlock the room structure from a retracted position. Any number of conventional locking devices can be employed, although it is preferred to use a system that is compact and connects adjacent to the end wall sections inside of the vehicle. After that, electric motors 80 are actuated to cause tubes 60 to slide out of tubes 50. Since each tube 60 is being driven at the same speed, binding of the end wall sections can be avoided even in relatively long room structures. As tubes 60 continue to slide out, roller 45 moves down inclined surface 33 and wheel 62 moves up ramp 56 so that floor sections 32 and 42 can become flush in expanded positions of the room structure.

However, preferred embodiments these movements of roller 45 and wheel 62 are in a specific sequence so as to provide proper sealing and streamlined construction. For example, ramp 56 is preferably disposed within tube 50 at a location where wheel 62 comes into contact with the ramp after most of tube 60 has slide out from tube 50. As wheel 62 moves laterally up ramp 56, tube 60 will pivot about drive wheel 52 and the end of tube 60 attached below side wall section 44 will sag downwardly. This results from the torque exerted by gravity on the cantilevered support of room portion 40. Floor section 42 is dimensioned and configured so as to be flush with floor section 32 after that pivoting or "sagging" has occurred. Therefore, prior to pivoting, floor section 42 would be slightly inclined with respect to floor section 32 because of the upthrusting effect at side wall 44 as a result of roller 45 starting to move down inclined surface 33. If this slight incline is maintained even as roller 45 continues to move down inclined surface 33 further advantage is obtained.

Figure 1A:
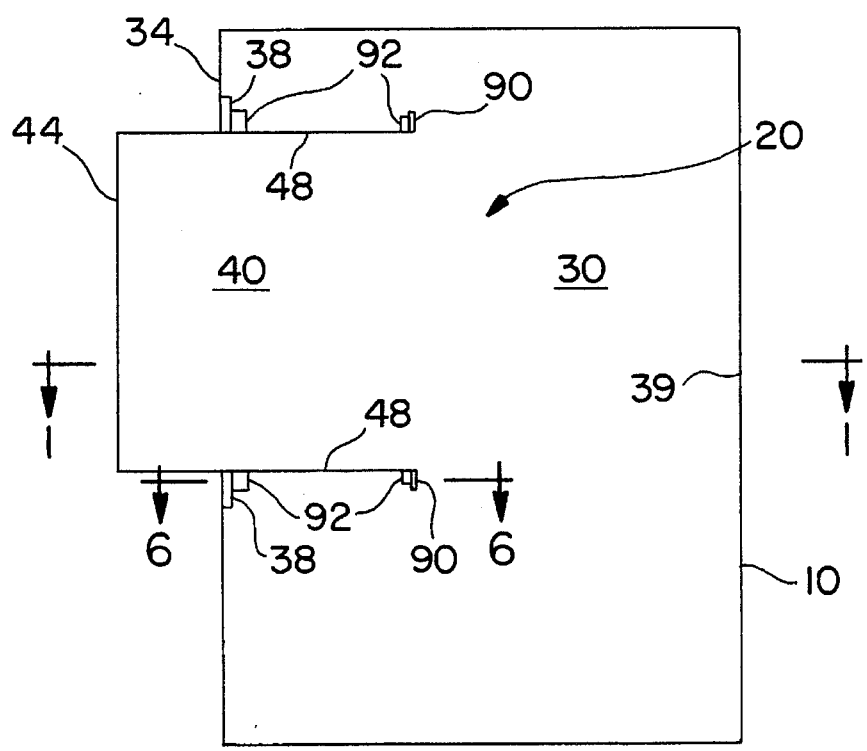
FIG. 1A shows schematically a cross sectional top view as taken along line A—A of FIG. 1.
Figure 6:
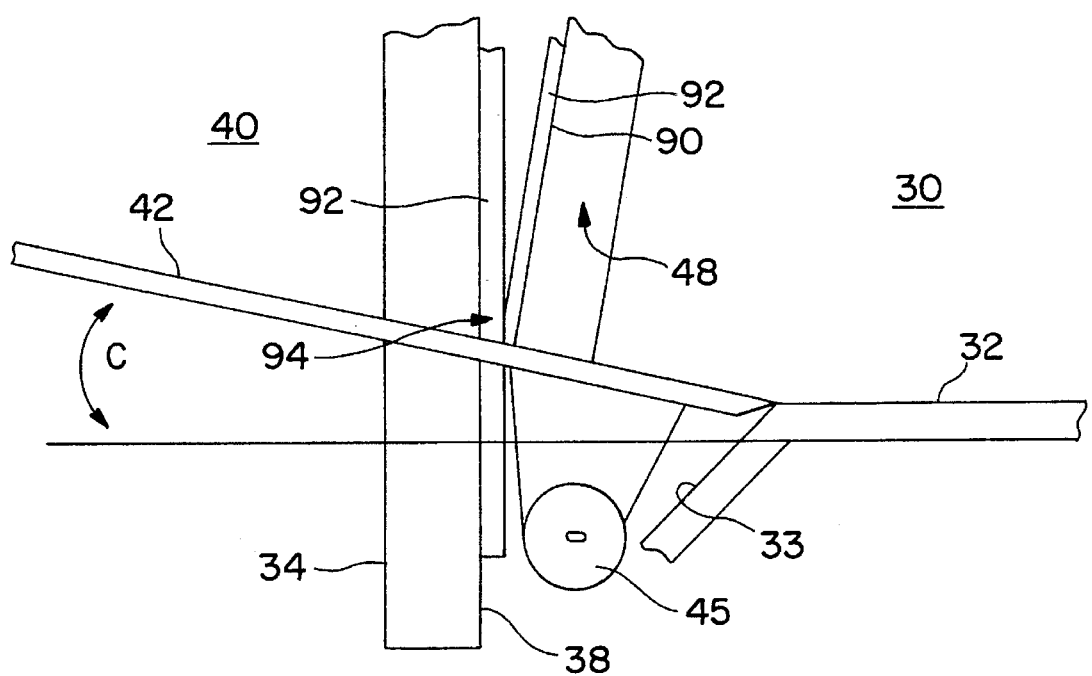
FIG. 6 shows a further enlarged cross sectional front view of the end wall junction of the embodiment of FIG. 2, taken along line 6—6 of FIG. 1A as the end walls are coming together during room expansion.

FIG. 6 shows an enlarged, partial view taken along the vertical plane of line 6—6 of FIG. 1A. Unlike FIG. 1A, in this view the converging end wall sections 38 and 48 are illustrated just as room portion 40 is moving to a fully expanded position. End wall sections 48 each include a stop wall 90 extending outwardly from that room portion. These stop walls serve to engage end walls 38 when room portion 40 is fully expanded and thereby limit the travel of that room portion outwardly from the vehicle. Conventional weather sealing material 92, as in compressible strip form, is placed on the abutting faces of stop walls 90 and/or end wall sections 38. If floor section 42 maintains a slight incline of angle C (that angle being exaggerated in degree in FIG. 6 for ease of viewing) with respect to floor section 32 as roller 45 moves down inclined surface 33, then stop walls 90 will first engage end wall sections 38 only at their lower portions 94. Subsequent pivoting of tube 60 about drive wheel 52 will cause stop walls 90 to pivot through angle C to fully abut end walls 38 and clamp sealing material 90 therebetween without adverse vertical sliding. In this way, weather sealing of the end wall sections can occur in a bottom to top sequence. Thereafter, the operator will typically lock each side of the room structure in an expanded position via the conventional locking devices.

To achieve this combination of results, the components of the present invention and their relative placement are preferably dimensioned such that roller 45 starts to move down inclined surface 33 before wheel 62 starts to move up ramp 56. After the initial movement of roller 45 down inclined surface 33, wheel 62 moves up ramp 56 as roller 45 continues downward, such that some longitudinal and lateral movement of room portion 40 occurs simultaneously. However, the relative angles and length of inclined surface 33 and ramp 5(5, are preferably established such that at least some pivoting of tube 60 occurs after roller 45 moves off inclined surface 33. Thus, the lateral distance that room portion 40 nee&; to be lowered in moving to expanded positions can be minimized and the supporting mechanism streamlined for minimal size and weight within a vehicle or other confined space.

Although the present invention has been described above with respect to specific embodiments, the same is by way of illustration and example only and is not to be taken as limitation. Numerous variations of the invention are contemplated in addition to those recited herein without departing from the essential features of this invention. Accordingly, the spirit and scope of the present invention are to be limited only by the terms of the claims below.

What is claimed is:

1. An expandable room structure comprising:

first and second room portions, each room portion having a floor, said second room portion being mounted so as to be movable with respect to said first room portion between expanded and retracted positions, the floor of the second room portion being disposed above the floor of the first room portion in the retracted positions, a first support tube mounted under said first room portion, a second support tube mounted under said second room portion, said second support tube being telescopically mounted with respect to the longitudinal length of said first support tube, and said second support tube being mounted for lateral movement with respect to said first support tube, the extent of that lateral movement being sufficient to permit the floor of said second room portion to be flush with the floor of said first room portion when the second room portion is in the expanded position.

2. The invention according to claim 1 wherein rack and pinion drive means are connected to said first and second support tubes for causing relative movement between those tubes.

3. The invention according to claim 2 wherein said rack and pinion drive means includes as the pinion a drive wheel mounted on one end of said first support tube and an inclined surface is mounted on said first support tube such that, at a predetermined point in telescopic extension of said second support tube from said first support tube, said second support tube pivots about said drive wheel and a portion of said second support tube moves laterally along said inclined surface.

4. The invention according to claim 1 wherein said first support tube includes a laterally inclined surface and said lateral movement of said second support tube is achieved by sliding engagement of said second support tube with said inclined surface.

5. An expandable floor structure, including a first floor and a second floor which are relatively movable between expanded and retracted positions, the second floor being disposed above said first floor in the retracted positions, and an apparatus for causing relative movement between the first and second floors such that the first floor is flush with the second floor in the expanded position, that apparatus comprising:

an outer rail connected to the first floor and extending longitudinally, an inner rail connected to the second floor and slidably mounted along the outer rail, a drive wheel connected to the outer rail and having a surface which engages the inner rail to cause sliding of the inner rail with respect to the outer rail, an inclined surface on the outer rail which extends laterally outward and is dimensioned so as to receive an end portion of the inner rail and thereby permit the inner rail to pivot about the drive wheel as the inner rail slides with respect to the outer rail.

6. The apparatus according to claim 5 wherein the first floor includes an inclined ramp along one side of that floor and the second floor includes at least one roller on its underside to permit the second floor to be movably supported on the first floor when in the retracted positions and to facilitate movement of the second floor down and up the inclined ramp as the second floor moves to and from the expanded position.

7. The apparatus according to claim 6 wherein the inner rail is connected to the second floor by a cantilevered mounting at one end of the inner rail, a plurality of openings are spaced along the length of the inner rail, and the surface of the drive wheel which engages the inner rail includes a plurality of projections which can be received in those openings.

8. The apparatus according to claim 7 wherein the inner and outer rails are formed as telescoping tubular elements, a free rolling wheel is attached to the end of the inner rail mounted within the outer rail to facilitate sliding movement between those rails and the free rolling wheel is engagable with the inclined surface as the inner rail slides with respect to the outer rail.

9. The apparatus according to claim 8 wherein the expandable floor structure includes at least two sets of the inner and outer rails, each set being spaced apart and having a common cross shaft connected to the drive wheel of each set, and includes at least one drive motor connected to that cross shaft so as to cause rotation of the drive wheels of each set of inner and outer rails.

10. The apparatus according to claim 9 wherein the cross shaft includes a keyed portion for receiving a hand tool for manually rotating the drive wheels.

11. A vehicle having a slide out room structure therein to selectively expand the internal accommodation of that vehicle, said room structure including a first portion and a second portion slidably nested within said first portion when said room structure is in retracted positions, each of said first and second portions having a roof section, side and end wall sections and a floor section, the floor section of said second portion being spaced above the floor section of said first portion when said room structure is in the retracted positions, and including means for moving said second portion relative to said first portion to define an expanded position of said room structure wherein the floor section of said first portion and the floor section of said second portion are disposed on the same horizontal plane, that means comprising:

at least first and second sets of telescoping tubular support members mounted beneath said room structure, each set including a inner tube and an outer tube, said first and second sets of tubular support members being spaced apart, aligned longitudinally along the line of expansion and retraction of said room structure and connected by a cross shaft element, one end of each of said inner tubes being connected adjacent said side wall section of said second portion and the other end of each of those tubes having a rotatable wheel element attached thereto and being mounted for sliding movement within one of said outer tubes, rack and pinion drive means provided on each of said sets of tubular support members, including a toothed drive wheel fixedly mounted at one end of each of said outer tubes and a plurality of spaced slots along each of said inner tubes for receiving the teeth of said drive wheel, said cross shaft joining each of said drive wheels to provide rotational force thereto, at least one drive motor connected to said cross shaft, an inclined ramp means formed on the interior of each of said outer tubes for receiving said wheel element, said inclined ramp means extending laterally out of said outer tube and being disposed along the length of said outer tube such that when said wheel element slides along said inclined ramp means said inner tube pivots about said drive wheel, a sloped end region provided on the side of the floor section of said first portion toward which said second portion moves in expansion of said room structure, and a carrier means mounted beneath the floor section of said second portion for supporting said second portion at least in part on said first portion when said room structure is in the retracted positions and for facilitating movement of the floor section of said second portion up and down said sloped end region.

12. The vehicle according to claim 11 wherein the length of said inner tubes, said outer tubes and the floor section of said second portion along the line of expansion and retraction of said room structure as well as the position of said inclined ramp means and the carrier means are correlated such that as the room structure is expanded said carrier means engages said sloped end region before said wheel elements engage said inclined ramp.

13. The vehicle according to claim 12 wherein the end wall sections of said first and second portions each include substantially vertical elements which abut the vertical elements of the end wall section of the other portion when the room structure is in the expanded position, and wherein during expansion of said room structure the abutting vertical elements first engage at one end thereof and thereafter pivot together coincident with the pivoting of said inner tubes about said drive wheels.

14. The vehicle according to claim 13 wherein at least one of said vertical elements includes a weather sealing surface thereon and locking means are provided on at least one of said end wall sections to selectively secure said room structure in the expanded position.

* * * * *